Sept. 16, 1958 — G. W. KALKOFEN — 2,851,729
VENTED CURING BAG
Filed April 5, 1956
FIG. 1
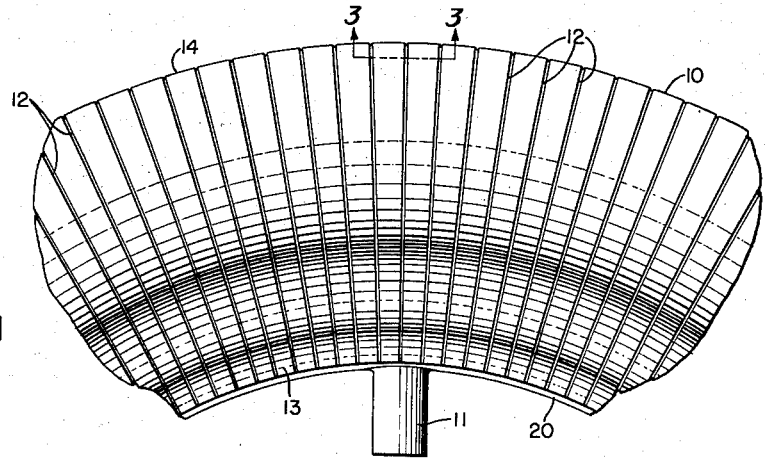
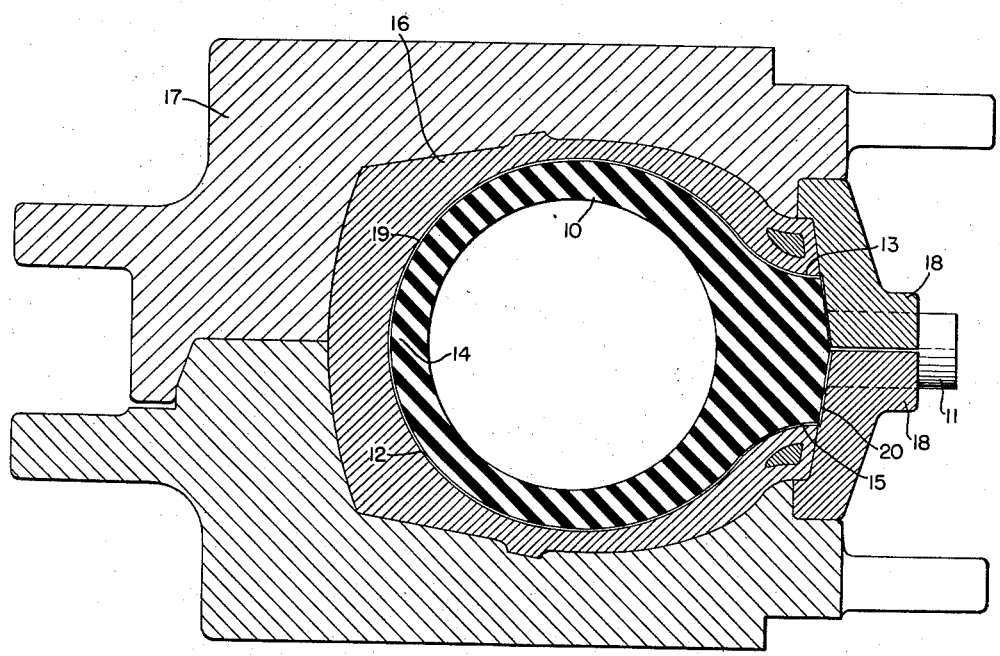
FIG. 2
FIG. 3
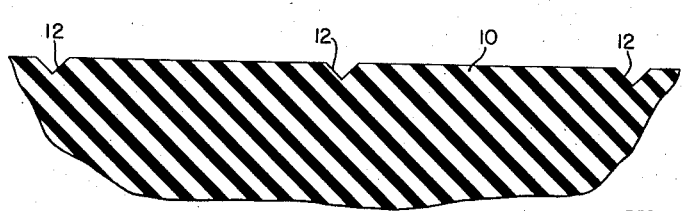
INVENTOR.
GERHARD W. KALKOFEN
BY
R. L. Miller
ATTORNEY United States Patent Office 2,851,729
Patented Sept. 16, 1958

2,851,729

VENTED CURING BAG

Gerhard W. Kalkofen, Mogadore, Ohio, assignor to The Goodyear Tire & Rubber Company, Akron, Ohio, a corporation of Ohio Application April 5, 1956, Serial No. 576,341

4 Claims. (Cl. 18—45)

This invention relates to a curing bag for curing tire casings and in particular to a curing bag for curing tubeless tire casings provided with venting grooves in its outer surface, to vent air from between the carcass of the tire and the curing bag in order to avoid blistering or ply separation caused by trapped air forced through the fabric of a carcass during the curing operation.

It is well known that in any tire vulcanizer air must be vented between the carcass of the tire and the curing bag in order to prevent separation of the fabric plies and formation of blisters. Many expedients have been practiced in an attempt to overcome this problem. A common expedient is to punch small holes through the rubber sidewalls or treads before vulcanization to let the gas escape. However, this is impractical for tubeless tires which require an air-impervious carcass. Conventional curing bags have been provided with small ribs to allow entrapped air to escape, but since tubeless tires are provided with a relatively thick rubber coating internally thereof, the ridges or ribs on the bag quickly become enveloped by the liner stock so that ribs are simply ineffective for venting air during cure of tubeless tires.

It is also well known to provide airbags with channels or grooves of U-shaped cross section which are widely spaced circumferentially of the bag and which extend either radially or angularly relative to the toe of the bag. Airbags groved in this manner quickly become pitted and the plane surfaces between the grooves chip after approximately 80 cures which necessitates buffing and regrooving of the bag, since the rough surfaces of the bag caused by the pitting and chipping produces a tire having a correspondingly undesirable rough interior surface. The buffing and regrooving of the surfaces of such bags is quite costly and must be done several times during the life of the bag. Eventually it becomes impossible to buff and regroove the bag and the bag is then discarded.

An object of this invention is to provide an airbag having grooves to prevent air from being trapped between the bag and the tire during cure which may be used in a greater number of successive cures without buffing and regroving.

Another object is to provide and airbag having venting grooves which more efficiently vent air from between the bag and tire during cure to provide a longer ultimate life during whih the bag need not be buffed and regrooved.

Other objects and advantages of this invention will be readily understood from a description of a preferred form of the invention illustrated in the accompanying drawings, in which:

Fig. 1 is a side elevational view of the curing bag of this invention with parts broken away;

Fig. 2 is a cross-sectional view of a curing mold and a tire showing the curing bladder of this invention mounted therein;

Fig. 3 is an enlarged cross-sectional view taken along the lines 3—3 of Fig. 1.

Referring to the drawings and in particular to Fig. 1, a curing bag 10 made of rubber or rubber-like material is provided with an inflating stem 11. A plurality of circumferentially spaced venting grooves 12 are either cut or molded in the exterior surface of the curing bag. The grooves 12 extend from the toe 13 of the bag across the entire tire contacting surface of the bag, including the crown 14, to the opposite toe 15. Each of the grooves extends in a radial plane relative to the axis of the bag and are spaced apart circumferentially at the toes 13 and 15 of the bag from $\frac{1}{10}$ to approximately $\frac{1}{4}$ of an inch so that the spacing at the crown 14 of the bag is within $\frac{1}{7}$ to approximately $\frac{1}{2}$ inch, the spacing of the grooves being measured from center to center thereof. Referring to Fig. 3 of the drawings, the grooves 12 are V-shaped in cross section and have a depth of less than $\frac{1}{16}$ inch. The width of the groove in the plane of the surface of the bag is also approximately $\frac{1}{16}$ inch.

During the curing operation the tire 16 and the bag 10 mounted therein are placed in the mold 17 with the mold rings 18 secured to the mold. The mold is then closed and the bag 10 inflated to the desired pressure by introducing air, water, steam or the like into the bag through the stem 11. As the bag is inflated it expands and forces the tire 16 against the interior surface of the mold 17. Air trapped between the curing bag 10 and the inner wall 19 of the tire casing flows down the passages formed by the grooves 12 past the base 20 of the bag and out through the clearance existing between the mold rings 18.

In order to demonstrate the advantages of this invention over conventionally grooved curing bags, comparative tests were conducted between the curing bag of this invention and bags grooved radially and angularly having widely spaced U-shaped grooves. The data relative to the surface condition of the bag, the total number of cures, the efficiency of removing trapped air, and the appearance of the tire liner were recorded. Conventionally grooved bags pitted and chipped badly after approximately 80 cures necessitating buffing and regrooving thereof. Several reconditioning operations of these bags permitted a total of 160 cures before the bags were scrapped because they became so severely chipped that they could not be reconditioned. Out of 160 tires cured, trapped air occurred in 1.88% and thin liners occurred in 1.25%.

In the tests conducted with curing bags of the present invention, chipping on the surface of the bags did not start until approximately 160 cures, the normal ultimate life of conventionally grooved bags, and the bags were used in over 220 cures without buffing or regrooving. No tires having trapped air were cured in the first 160 cures and in the 60 tires subsequently cured only 1.2% were found to have trapped air. Furthermore, none of the tires cured in the bags grooved according to this invention had thin liners.

It is seen that curing bags grooved according to this invention vent air more efficiently than bags grooved according to prior known methods. But more important, the ultimate life of the bags of this invention is increased by over $\frac{1}{3}$ without reconditioning the surface of the bag several times as required for bags grooved according to known methods. It is believed that these improved results flow from the fact that in this invention the V-shape of the groove and the spacing thereof permits the products of oxidation occurring at the surface of the bag to accumulate in the base of the grooves rather than on the surface of the bag. The accumulation of the products at the base of the grooves not only prevents the groove from deepening due to cracking in the base thereof, but the reduction of the amount of oxides on the surface of the bag retards chipping and pitting thereof.

While certain representative embodiments and details have been shown for the purpose of illustrating the invention, it will be apparent to those skilled in this art that various changes and modifications may be made therein without departing from the spirit or scope of the invention.

I claim:

1. A curing bag for curing tires, said bag being made of rubber and having a plurality of grooves formed in the outer surface thereof, each grove extending across the entire tire contacting surface of the bag from toe to toe thereof, said grooves being V-shaped in cross section, having a depth of less than 1/16 inch, and a width of approximately 1/16 inch at the surface of said bag, the spacing of said grooves at the toe of said bag being approximately 1/4 inch.

2. A curing bag as claimed in claim 1 in which the grooves are positioned in a radial plane relative to the axis of the bag.

3. A curing bag as claimed in claim 1 in which the spacing of said grooves at the crown is approximately 1/2 inch from center to center thereof.

4. A curing bag as claimed in claim 2 in which the spacing of said grooves at the crown is approximately 1/2 inch from center to center thereof.

References Cited in the file of this patent

UNITED STATES PATENTS 2,678,468     Smith _____ May 18, 1954

FOREIGN PATENTS 732,287     Great Britain _____ June 22, 1955